US011704151B2

(12) United States Patent
Zhang et al.

(10) Patent No.: US 11,704,151 B2
(45) Date of Patent: Jul. 18, 2023

(54) ESTIMATE AND CONTROL EXECUTION TIME OF A UTILITY COMMAND

(71) Applicant: International Business Machines Corporation, Armonk, NY (US)

(72) Inventors: Hong Mei Zhang, Beijing (CN); Xiaobo Wang, Beijing (CN); Sheng Yan Sun, Beijing (CN); Shuo Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 17/034,022

(22) Filed: Sep. 28, 2020

(65) Prior Publication Data

US 2022/0100559 A1    Mar. 31, 2022

(51) Int. Cl.
*G06F 9/48* (2006.01)
*G06F 9/50* (2006.01)
*G06F 9/38* (2018.01)

(52) U.S. Cl.
CPC .......... *G06F 9/4881* (2013.01); *G06F 9/3836* (2013.01); *G06F 9/48* (2013.01); *G06F 9/4806* (2013.01); *G06F 9/4887* (2013.01); *G06F 9/50* (2013.01); *G06F 9/5005* (2013.01); *G06F 9/5038* (2013.01); *G06F 9/5061* (2013.01); *G06F 9/5066* (2013.01)

(58) Field of Classification Search
CPC ........ G06F 9/48; G06F 9/4843; G06F 9/4881; G06F 9/50; G06F 9/5038; G06F 9/3836; G06F 9/4806; G06F 9/4887; G06F 9/5005; G06F 9/5061; G06F 9/5066
See application file for complete search history.

(56) References Cited

U.S. PATENT DOCUMENTS 7,120,648 B2    10/2006   Garth et al.
7,430,557 B1     9/2008   Loboz et al.
(Continued)

OTHER PUBLICATIONS

"Remaining execution time estimation for REORG utility," IP.Com, An IP.com Prior Art Database Technical Disclosure, IP.com No. IPCOM000250808D, IP.com Electronic Publication Date: Sep. 6, 2017, 4 pages https://priorart.ip.com/IPCOM/000250808.
(Continued)

*Primary Examiner* — Charles M Swift
(74) *Attorney, Agent, or Firm* — Rachel M. Yadlosky

(57) ABSTRACT

A method, system, and computer program product to plan and schedule executions of various utility tasks of a utility command during a maintain window, the method including receiving a utility command. The method may also include identifying possible utility tasks used to execute the utility command. The method may also include determining preferred utility tasks. The method may also include calculating a degree of parallelism for the preferred utility tasks. The method may also include generating a utility execution plan for the utility command. The method may also include analyzing the utility execution plan against resource constraints of a time window and sub time windows of the time window. The method may also include generating a time window execution plan for each sub time window of the sub time windows. The method may also include updating the utility execution plan with the time window execution plans.

20 Claims, 9 Drawing Sheets

(56) References Cited

U.S. PATENT DOCUMENTS

| | | | | |
|---|---|---|---|---|
| 2011/0113011 A1* | 5/2011 | Prorock | ................ | G11B 27/36 |
| | | | | 707/634 |
| 2015/0178126 A1* | 6/2015 | Modani | ................ | G06F 9/4881 |
| | | | | 718/102 |
| 2015/0301870 A1* | 10/2015 | Gehin | ..................... | G06F 9/52 |
| | | | | 718/106 |
| 2016/0098292 A1* | 4/2016 | Boutin | ................... | G06F 9/505 |
| | | | | 718/104 |
| 2016/0313991 A1* | 10/2016 | Wei | ..................... | G06F 9/3851 |
| 2018/0150299 A1* | 5/2018 | Balle | ..................... | G06F 8/658 |
| 2020/0233706 A1* | 7/2020 | Smith | ................... | G06F 9/5066 |
| 2021/0124611 A1* | 4/2021 | Saillet | ................... | G06F 9/4843 |

OTHER PUBLICATIONS

"DB2 Table Driven Parallel Runstats," IP.Com, An IP.com Prior Art Database Technical Disclosure, IP.com No. IPCOM000182443D, IP.com Electronic Publication Date: Apr. 30, 2009, 3 pages, https://priorart.ip.com/IPCOM/.

"Syntax and options of the Reorg Index control statement," IBM, Jun. 9, 2020, 22 pages www.ibm.com/support/knowledgecenter/SSEPEK_11.0.0/ ugref/src/tpc/db2z_reorgindexsyntax.html.

* cited by examiner

ESTIMATE AND CONTROL EXECUTION TIME OF A UTILITY COMMAND

BACKGROUND

The present disclosure relates to computer commands (e.g., utility commands) and change/maintain windows and, more specifically, to planning and scheduling the execution of the various utility tasks of the utility command so that the utility command can be fully executed during the change window.

Computer systems only have a limited number of resources, including bandwidth, processing power, memory, etc. Therefore, to avoid exceeding the available resources and overloading the computer system, certain processes and programs may be scheduled to execute during certain time windows. In some instances, these time windows are at times of day where a computer may not be very active (for example, overnight during user sleeping hours). Therefore, a user may be much less likely to be active on the computer system during those time windows and there may be more resources available to run the necessary programs. These time windows may be referred to herein as maintain windows or change windows. Maintain windows, or change windows, may be time windows where computer maintenance and/or changes may occur.

SUMMARY

The present invention provides a computer-implemented method, system, and computer program product to plan and schedule executions of various utility tasks of a utility command during a maintain window. The method may include receiving a utility command. The method may also include identifying possible utility tasks used to execute the utility command. The method may also include determining preferred utility tasks from the possible utility tasks. The method may also include calculating a degree of parallelism for the preferred utility tasks. The method may also include generating a utility execution plan for the utility command based on the preferred utility tasks and the degree of parallelism. The method may also include analyzing the utility execution plan against resource constraints of a time window and sub time windows of the time window, where the utility command will be executed in the time window. The method may also include generating a time window execution plan for each sub time window of the sub time windows. The method may also include updating the utility execution plan with the time window execution plan, resulting in an updated utility execution plan. The computer program product may include similar steps.

The system may be configured to receive a utility command. The system may also be configured to identify possible utility tasks used to execute the utility command. The system may also be configured to determine preferred utility tasks from the possible utility tasks. The system may also be configured to calculate a degree of parallelism for the preferred utility tasks. The system may also be configured to analyze the preferred utility tasks against resource constraints of a time window and sub time window of the time window, where the utility command will be executed in the time window. The system may also be configured to generate a utility execution plan for the utility command based on the preferred utility tasks, the degree of parallelism, and the resource constraints.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
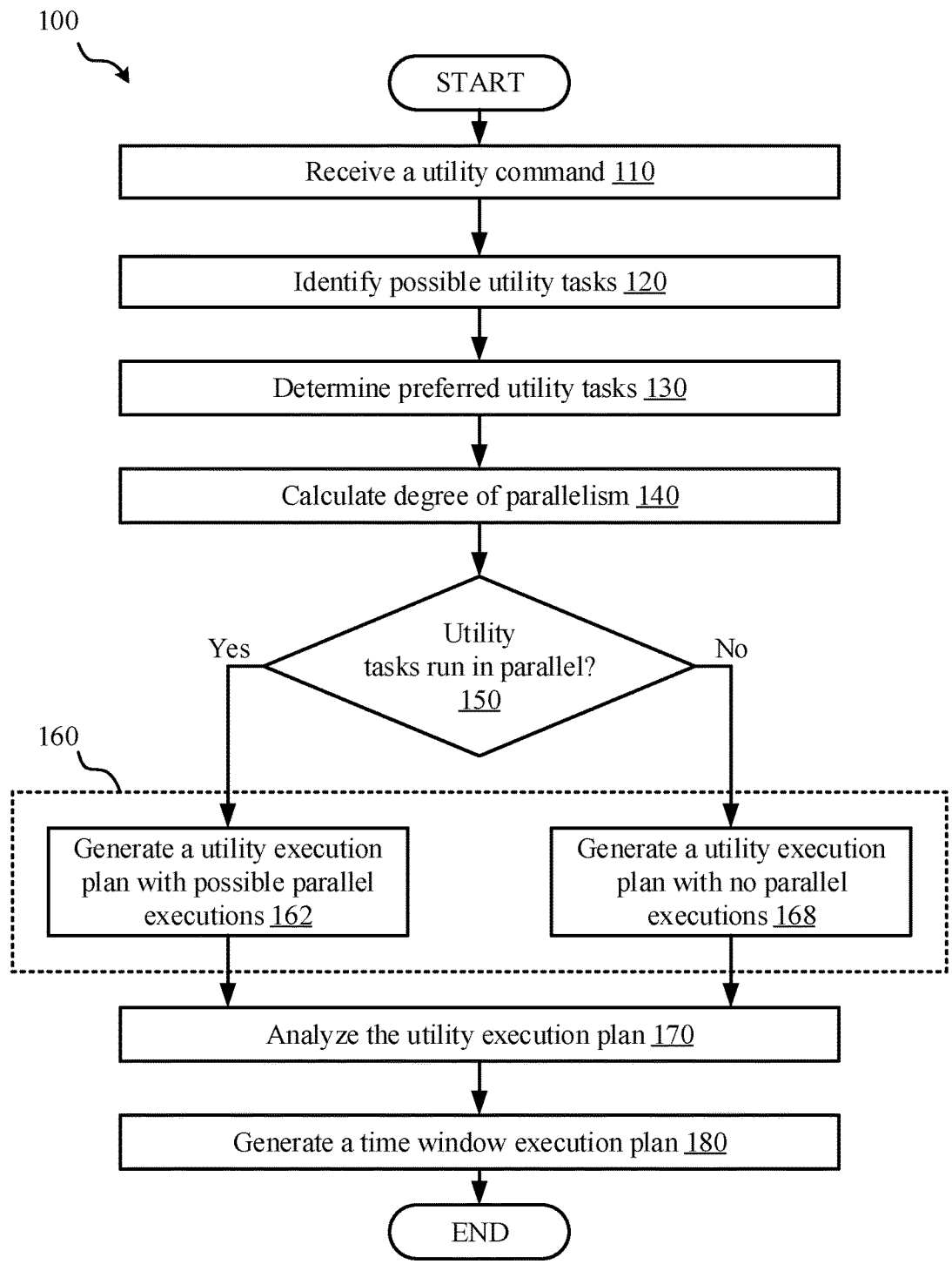
FIG. 1 depicts a flowchart of a set of operations for planning an execution of the various utility tasks of a utility command, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to computer commands (e.g., utility commands) and change/maintain windows and, more specifically, to planning and scheduling the execution of the various utility tasks of the utility command so that the utility command can be fully executed during the change window. While the present disclosure is not necessarily limited to such applications, various aspects of the disclosure may be appreciated through a discussion of various examples using this context.

As discussed herein, various programs and/or commands may be executed during a maintain window. This may help prevent overloading the computer system and running out of resources. Maintain windows may often be during time windows where the computer system is not using many resources and/or when there are less online transactions, for example, during times (e.g., overnight) where a user may be sleeping. Scheduling maintain windows for times where a user is likely not active on the computer system may help allocate the resources so that there are enough resources for user activity on the computer system (for example, executing application software for applications used by the user) as well as for other activities and programs.

In some instances, programs that may be run during the maintain window may often include utilities. Utilities may be software programs that benefit the computer system. For instance, utilities may include software for maintaining, analyzing, configuring, etc. the computer system. Some examples of utilities may include antivirus software, other security software, file management software, etc. A utility command, as referred to herein, may be an instruction and/or command to perform the utility (or utilities). For example, a utility may be an antivirus program, and a utility command may be an instruction (for example, from the computer system with the antivirus program installed (e.g., a user computer system), the computer system for the antivirus company, etc.) to update the antivirus program.

In some instances, a utility command may be executed during the maintain window. Because utilities may be focused on benefitting and/or improving the computer system, they may not need to be executed during times that a user is using a computer system, because the user may not be directly using the utilities. For example, while a utility such as an antivirus program may benefit both the user and the computer system, as long as the antivirus program is active, the antivirus program may not be directly used by the user. Instead the user may be running other applications, for example, by browsing the internet. Therefore, in this example, during times of day where the user is active on the computer, the system may preserve resources (for example, so there are enough resources for the user to browse the internet) by updating the antivirus program during a maintain window when the user is not active on the computer system.

In some instances, the utility command may need to finish executing during the maintain window. For example, there may be another utility command and another maintain window immediately following the first maintain window, and the system may not have enough resources for both utility commands to execute at the same time (for instance, if the utility command had to continue executing during the second maintain window).

In some instances, the computer system may have blackout time frames where various programs, such as utilities, may not be executed (for example, during times where resources are scarce and/or when a user may be using an increased amount of resources). If a maintain window is followed by a blackout window, anything that is not completed during the maintain window may not be executed (for example, due to lack of resources, other utility commands being executed, users working on the computer system, etc.). For example, if antivirus software is being updated during a maintain window, but it is not completed before the maintain window is over, all of the necessary operations in order to complete the updated may not have been executed, which may cause the update to the antivirus software to fail, as all the operations did not finish.

Although utility commands are discussed herein, the present invention may apply to any commands that may need to be executed during a specific time window. For instance, computers also execute application software (e.g., software for applications, or apps, on a computer system) to help perform tasks that may benefit users of the computer. If the software, such as application software, needs to be executed in a specific time window, the same or similar methods discussed herein may be applied.

The present invention provides a computer-implemented method, system, and computer program product for planning and scheduling the execution of the various utility tasks of a utility command so that the utility command can be fully executed during a maintain window. As discussed above, if a utility command does not finish executing during the maintain window (for example, resulting in an error), additional resources may be needed to finish executing the utility command, which may overload the system, or the system may just stop working on the utility command after the maintain window, which may cause errors with the utility command. Additionally, in some instances, if the execution is not properly planned and scheduled, the system may overload during the maintain time window, as the system may have to use too many resources in order to finish executing the utility command within the maintain window. For instance, other utility commands may also be executed during the same maintain window, or similar maintain windows, (or other programs may be executed on the system at similar times) so the system may be distributing resources amongst the different utility commands and maintain windows.

In some embodiments, a utility command may include multiple operations. For example, data tables may be reorganized (for instance, by reconstructing rows to eliminate fragmented data and/or compact information) in response to a reorganization command. In this example, the reorganization command is a utility command. In order to reorganize the data table, in this example, multiple operations may occur such as identifying the target data (for instance, the desired data or data table), identifying parameters of the data and/or data table, unloading the data, reloading the data, sorting the data, building the new data table, performing log apply services to apply redo data (i.e., data, such as logs, that record changes made to the database(s)), etc. Each of these operations may have a variety of possible tasks that could potentially be used to execute the operation. In some instances, some tasks may be alternative operations for performing a same operation. For example, an unload operation could be performed through a terminal server (TS) scan, a cluster index, a parallel unload, etc. In some instances, a single operation may need multiple tasks in order to perform the operation. These various tasks may be referred to herein as utility tasks.

In some instances, as discussed herein, the utility command is made up of one or more operations (to execute the utility command). Each operation may include one or more functions (to execute the operation). In some instances, one or more of the functions may be necessary in order to execute the operation and the utility command. These functions may be referred to herein as necessary functions. For example, a utility command may be a reorganization command, an operation of the reorganization command may be an unload operation, and a necessary function of the unload operation may be to sort the data. To plan execution of a utility command in a way that increases the likelihood that it will be completed during the maintain window, the various possible utility tasks for each operation in the utility command may be analyzed and the utility tasks that correspond to the necessary functions may be determined. A task, or tasks, that correspond to a necessary function may be a task, or tasks, that accomplish the necessary function or a portion of the necessary function.

In some instances, the utility task (by itself) may accomplish (for example, perform) the function, and there may not be any other possible functions that can accomplish the same function. In some instances, the utility task (by itself) may accomplish the function, and there may be other possible utility tasks that can accomplish the same function. In this instance, any one of the possible utility tasks that can accomplish that same function may be used as the function, but it is likely that only one of the possible tasks will be selected as the preferred function. In some instances, none of the utility tasks, by themselves, may accomplish the necessary function, however the utility task may accomplish a portion of the necessary function. In this instance, a plurality of utility tasks (each utility performing a portion of the function) together may accomplish the necessary function. In some instances, there may be multiple possible tasks that could accomplish the same portion of the necessary function. For example, a first task and a second task, when paired together, may accomplish a first function. In this example, a third task may accomplish the same portion of the first function (e.g., portion A), therefore the third task and the second task, when paired together, may also accomplish the first function. In this example, there may be a fourth task that may accomplish the first function on its own, without being paired with another function.

In some instances, there may only be one utility task that corresponds to a specific necessary function. In this instance, the utility task corresponding to the specific necessary function may be referred to as a preferred utility task. In some instances, there may be a plurality of utility tasks that correspond to a specific necessary function. In these instances, one of the utility functions (for example, the utility function with the smallest execution time) may be the preferred utility task. The preferred utility tasks may be used to form the execution plan, so that tasks that may use up too much time and resources may not be executed and the plan (and the utility command) may be completed within the maintain window. Further, in some instances, some of the utility tasks may be run in parallel, which may shorten up the execution time of the utility tasks. In some instances, there may be additional time and resources available for the execution plan. For example, some of the preferred utility tasks may be run in parallel, and there may be additional time and resources to execute other utility tasks that may not be preferred utility tasks. These tasks, in some instances, may be added to the execution plan.

Referring now to FIG. 1, a method 100 for planning an execution of the various utility tasks of a utility command is depicted, according to some embodiments. In some embodiments, method 100 is executed by a server (e.g., computer system/server 902 (FIG. 9)) on or connected to a computer system (e.g., computer system 900 (FIG. 9)). In some embodiments, the method 100 is implemented as a computer script or computer program (e.g., computer executable code) to be executed on or connected to the computer system. In some embodiments, the method 100 is executed by a processor (e.g., processing unit 910 (FIG. 9)) on or connected to a computer system (e.g., computer system 900 (FIG. 9)).

Method 100 includes operation 110 to receive a utility command. As discussed herein, a utility command may be an instruction and/or command to perform the utility (or utilities). The utilities, or a utility, may be software programs that benefit the computer system, such as software for maintaining, analyzing, configuring, etc. the computer system. Example utilities may include debugging programs, antivirus programs, reorganization programs, backup programs, etc. In some embodiments, receiving a utility command includes receiving an instruction to perform the utility. In some embodiments, the utility command may include a deadline for executing the utility. For example, a utility command may be an instruction to perform a software update for the operating system (OS) on the computer system. The command may include information that the update must occur within the next 5 days. Therefore, in this example, receiving the utility command may include receiving an instruction to perform an OS software update within the next 5 days. In some instances, if the update does not occur within the 5 day period, the computer system may have to do a force update where the update automatically occurs at that time, regardless of what is occurring on the computer system. To avoid a force update and better allocate and save system resources (e.g., bandwidth, processing power, memory, etc.), the computer system may plan to execute the utility command (in this example, by performing the software update to the OS) during a maintain window that is within the 5 day period. For example, the update may be scheduled to occur during a maintain window from 12:00 AM to 2:00 AM on the third day (i.e., at a point within the 5 day period).

Method 100 includes operation 120 to identify possible utility tasks used to execute the utility command. To execute a utility command, one or more operations may be performed. For example, for a reorganization utility command, operations of identifying the target data (for instance, the desired data or data table), identifying parameters of the data and/or data table, unloading the data, reloading the data, sorting the data, building the new data table, performing log apply services to apply redo data (i.e., data, such as logs, that record changes made to the database(s)), etc. may be performed in order to fully reorganize the data tables and execute the reorganization utility command. Each of these operations may have a variety of possible utility tasks (i.e., ways to achieve the operation) that may be used to perform, or achieve, the operation. For example, an unloading operation in a reorganization command may be achieved via tasks including a TS scan, a TS scan and sort, a cluster index, a parallel unload, an unload into a dataset, a pipe in memory, and a discard. Each of these tasks may be a possible utility task. In some instances, the possible utility tasks include multiple potential tasks for achieving the same function of the specific operation. For example, "TS scan" and "TS scan and sort" may achieve the same function of scanning. In some instances, the task may perform multiple functions (for example, "TS scan and sort" performing both a scan function and a sort function). In some embodiments, identifying possible utility tasks may include identifying the operations for the utility command and then determining the possible tasks for each operation.

Method 100 includes operation 130 to determine preferred utility tasks from the possible utility tasks. Although there may be numerous possible utility tasks, every utility task may not be necessary and/or preferred in order to complete the utility command. In some embodiments, as discussed herein, the utility command is made up of one or more operations (to execute the utility command). Each operation may include one or more functions (to execute the operation). In some embodiments, one or more of the functions may be necessary in order to execute the operation and the utility command. These functions may be referred to herein as necessary functions. For instance, continuing the reorganization utility command example, the utility command may need to perform an unload operation as a part of the command, but all the possible tasks (e.g., TS scan, TS scan and sort, cluster index, parallel unload, unload into a dataset, pipe in memory, discard, etc.) may not be needed in order to perform an unload operation and the necessary functions that make up the unload operation. Instead, only a few of the tasks (or in some instances, only one task) may be needed to execute each necessary function of the operation of the utility command.

In some embodiments, the preferred utility tasks achieve the necessary functions for the operations of the utility command. For example, the TS scan task may be the preferred task for the unload operation of the reorganization command, but there may be additional preferred task(s) for a reload operation, for a sort operation, etc.

In some embodiments, determining preferred utility tasks may include calculating an estimated execution time for each of the possible utility tasks. The execution time is the time it takes to execute, or complete, the utility task. For example, for the unload operation of the reorganization command, the "TS scan" task may have a predicted execution time of 1 minute, the "TS scan and sort" task may have a predicted execution time of 4 minutes, the "cluster index" task may have a predicted execution time of 45 seconds, the "parallel unload" task may have a predicted execution time of 1.5 minutes (or 1 minute and 30 seconds), etc. In some instances, a machine learning model may be used to calculate the estimated execution times. In some embodiments, calculating the estimated execution time for a utility task may include determining an average execution time for the past executions of the utility task. In some embodiments, calculating an estimated execution time for a utility task may include determining a number of page input/outputs (I/Os) (i.e., I/O cost) for the task and a number of instructions (i.e., CPU cost) that make up the task. The total cost, or execution time, for the utility task may be the total of I/O costs and CPU costs for that task. In some instances, the I/O costs and/or the CPU costs may be weighted, for example based on the contents of each page I/O and/or the difficulty of each instruction. In some embodiments, the estimated execution time is calculated for each of the possible utility tasks that correspond to a necessary function of the utility command.

In some embodiments, determining preferred utility tasks may include analyzing operations for the utility command. Analyzing the operations for the utility command may include identifying the various data used for each operation (for example, the inputs and outputs). In some embodiments, determining preferred utility tasks may include identifying data inputs for the operations of the utility command. This may be based on the analyzing. For example, an unload operation (for a reorganization utility command) may require target data and parameter inputs. The target data may be the data or data table(s) that is desired for the reorganization and the target data table may be a data table without fragmented data. In some embodiments, parameters may include variables (for example, required variables or conditions) for the command. In this example, the data table may have possible parameters of online, offline, read only, write only, etc. A parameter for the unload operation of the reorganization command may be, for example, that the data table (or the system that corresponds to the data table) needs to be online (with online being the parameter) in order to perform the unload operation. Therefore, the preferred task may be a task that does not include any offline activity, as the data table needs to be online.

In some embodiments, determining preferred utility tasks may include selecting utility tasks for each operation (or each function of each operation) based on the data inputs and the estimated execution time. For instance, some of the data inputs required for various operations of the utility command may not be applicable for various utility tasks. For example, if the utility command is a debugging command that includes identifying and removing various errors in software, one of the operations of the debugging command may be to dump erroneous data. One of the required inputs for the dump operation may be the software errors. Additionally, the dump operation may have a necessary function of dumping data. However, in this example, there may be a possible utility task for the dump operation and the necessary dumping data function that dumps the entire data table. The utility task of dumping the entire table may not be preferred for a dump operation for a debugging command, because only the errors should be dumped, not the entire data table of software. Therefore, the utility task of dumping the entire data table may not be selected as a preferred utility task for the debugging utility command because dumping an entire data table, although it may be one possible task that achieves the dumping data function, is not very beneficial for a dump operation that dumps erroneous data.

In some embodiments, once it is determined which utility tasks are not applicable for the specific operation of the utility command and/or the necessary function, tasks may be selected from the remaining utility task(s) based on their estimated execution times. For instance, the tasks with the lowest execution times for each operation may be selected. In some embodiments, more than one utility task may properly execute a necessary function. For example, a "TS scan" task and a "TS scan and sort" task may both achieve a necessary function of scanning data. In these instances, the utility task(s) with the lowest execution times that also properly execute the necessary function may be selected. For example, a sort operation for a reorganization utility command may have necessary functions of sorting both a map index and keys. Therefore, in this example, the utility task with the lowest execution time from the utility tasks that sorts a map index and the utility task with the lowest execution time from the utility tasks that sorts keys may be selected. In some embodiments, the selected tasks may be the preferred utility tasks, as they are the preferred utility tasks to execute, or achieve, the necessary functions.

Method 100 includes operation 140 to calculate a degree of parallelism for the preferred utility tasks. The degree of parallelism indicates which tasks can be executed simultaneously by the computer system. In some embodiments, the degree of parallelism includes the number of parallel execution servers that are available for each utility task (for example, to execute each utility task). In some instances, calculating the degree of parallelism may include determining the time window that the utility command will be executed and then determining what system resources are available during that time window. Then it may be determined which servers are available for executing each preferred utility task. In some instances, it may be determined which of the available servers, if any, for each preferred utility task have parallel execution capabilities. For example, the degree of parallelism for a TS scan utility task may be 3, indicating that there are 3 available parallel execution servers for the TS scan.

Method 100 includes operation 150 to determine whether any of the utility tasks can be run in parallel (for example, based on their compatibility with and/or dependence, or lack of dependence, on each other). For instance, once it is determined which tasks have parallel execution capabilities (for example, due to their available parallel execution servers), it may be determined which of these tasks can be run in parallel and still achieve the necessary functions and/or execute the operations of the utility command. For example, if a utility task requires (as an input) the results of another utility task, the two utility tasks may not be executed in parallel, because one task is dependent on the second task.

In some instances, determining whether any of the utility tasks can be run in parallel may include mapping out the various potential parallel executions. For instance, each utility task with parallel execution capabilities may be mapped to the utility tasks that it can parallelly execute with.

In some embodiments, determining whether any of the utility tasks can be run in parallel includes determining whether any preferred utility tasks can be run in parallel (for example, based on their compatibility and dependability). For instance, before the utility execution plan is generated, the preferred utility tasks may be analyzed against resource constraints of a time window and sub time windows of the time window (for example, similar to operation 170). In some instances, determining whether any of the utility tasks can be run in parallel includes determining whether some of the other possible utility tasks can be run in parallel with the preferred utility tasks. For instance, some of the possible utility tasks (that are not preferred utility tasks) may include tasks that achieve functions that are not necessary for the utility command and/or may include tasks that achieve necessary functions, but are not the preferred way (for example, because of their execution time) to achieve the necessary functions. These tasks may still be beneficial to the utility command, in some instances, therefore if they can be executed in parallel with the preferred utility commands, they may be included in the execution plan for the utility command.

If one or more of the utility tasks can be run in parallel (from operation 150), method 100 proceeds to operation 162 to generate a utility execution plan with possible parallel executions. A utility execution plan is a plan or schedule, for instance an order of operations, for the utility command. For instance, the utility execution plan may include an execution order for each of the preferred utility tasks. In some embodiments, when some of the utility tasks are able to be executed in parallel, the utility execution plan may include some of the utility tasks executing in parallel. For example, the execution plan may include that a loading task immediately follows an unloading data task (because the loading task may depend on the unloaded data), and that a second loading task is run in parallel with a first loading task. Generating the utility execution plan is further discussed herein and depicted in FIG. 4. Further, FIG. 8 includes a schematic depiction of an example utility execution plan, in some embodiments.

If none of the utility tasks can be run in parallel (from operation 150), method 100 proceeds to operation 168 to generate a utility execution plan with no parallel executions. In some instances, none of the preferred utility tasks may be capable of executing in parallel. For example, there may not be any available parallel execution servers during the time window, the preferred utility tasks may be dependent on each other, etc. In these instances, there may not be any parallel executions that are possible for the utility command, therefore the utility execution plan may not include any parallel executions. Generating a utility execution plan with no parallel executions may include organizing each preferred utility command in execution order (for instance, based on their necessary function and/or inputs and outputs. For instance, an operation of the utility command may have one or more necessary functions, and there may be an order for executing each necessary function so that the operation, and therefore the utility command, is properly executed. Therefore, in some instances, each preferred utility command may be organized based on their corresponding necessary function and the execution order of the necessary functions, so that the utility command (and the operations of the utility command) is properly executed. In some embodiments, operations 162 and 168 may be referred to collectively as operation 160 to generate a utility execution plan. The utility execution plan may be generated based on the preferred utility tasks and the degree of parallelism.

Method 100 includes operation 170 to analyze the utility execution plan against resource constraints of a time window and sub time windows of the time window. The time window may be a maintain window that the utility command will be executed in. The resource constraints may be the limitations on the resources (for example, the amount of resources available) during the time window. For example, 10 kilobytes of memory, 32 bits of random access memory (RAM), 5 megabytes per second (MB/s) of bandwidth, etc. may all be potential resource constraints. In some embodiments, the resources may not be the same throughout the entire time window. For example, 5 MB/s of bandwidth may be available from 12 AM-1 AM, but 10 MB/s of bandwidth may be available from 1 AM-3 AM. Therefore, in some instances, the time window may be broken up into sub time windows to more accurately determine the availability and constraints of the resources throughout the time window.

Figure 7:
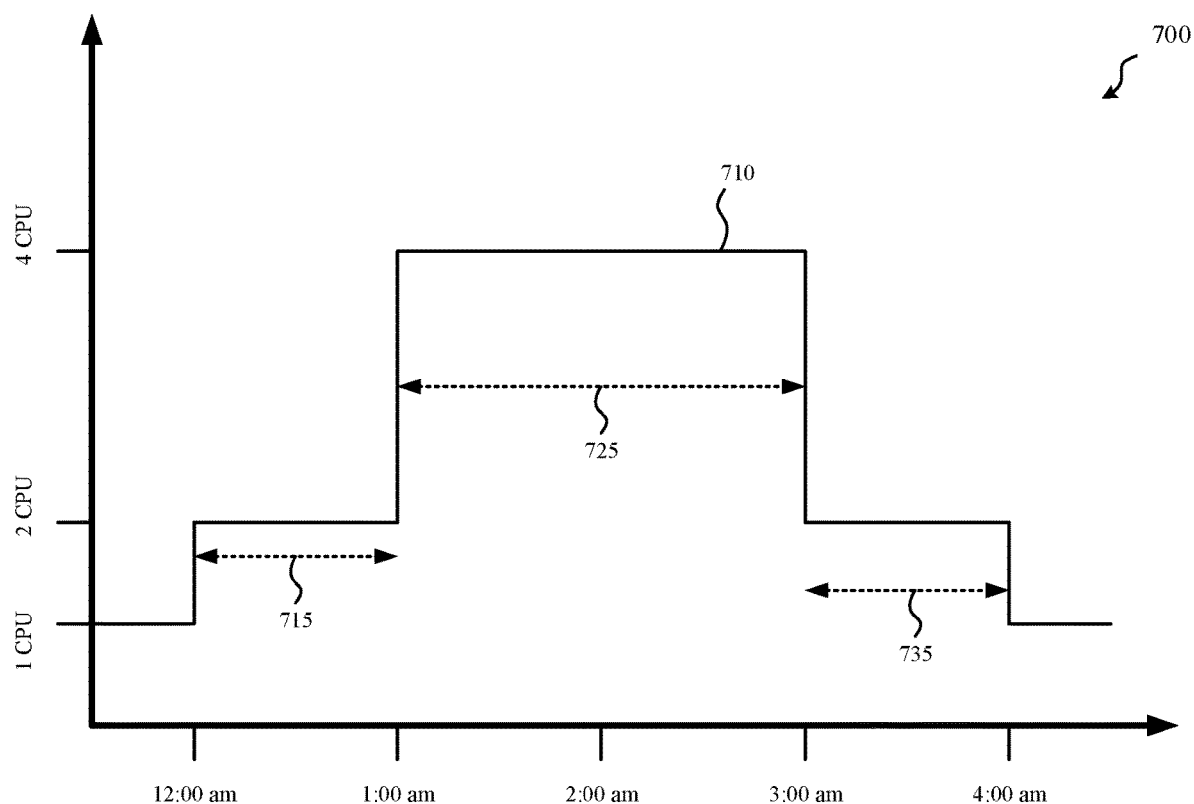
FIG. 7 depicts a schematic diagram of available resources during various time windows throughout a maintain window, according to some embodiments.

In some embodiments, analyzing the utility execution plan against the resource constraints of the time window and sub time windows incudes arranging utility tasks (in the utility execution plan) based on the sub time windows. This may result in utility task sub-groups. For example, if 15 total utility tasks are being executed during the time window of 1 AM-4 AM, 3 of the tasks may be arranged in a sub-group and may execute during a first sub time window from 1-2 AM, 10 tasks may be arranged into a second sub-group that executes during a second sub time window from 2 AM-3:15 AM, and the remaining 2 utility tasks may be arranged into a third sub-group that executes during a third sub time window from 3:15 AM-4 AM. In this example, the majority of tasks may be in the second sub-group for the second sub time window because more resources may be available during the second time window. FIG. 7 depicts an example diagram of resource availability during an example time window and sub time windows.

In some embodiments, analyzing the utility execution plan against the resource constraints of the time window and sub time windows incudes analyzing the resource constraints for each sub time window. In some embodiments, the sub time windows may be created based on the resource constraints. For instance, new sub time windows may be created each time the available resources and/or resource constraints change. In these instances, analyzing the resource constraints for each sub time window may occur at a same time or an earlier time than the arranging the utility tasks based on the sub time windows.

In some embodiments, the sub time windows may be predetermined time increments. For example, each sub time window may be a 30 minute period, each sub time window may be an hour period, etc. In these instances, analyzing the resource constraints for each sub time window may be done after the sub time windows are created and established. In some embodiments, analyzing the resource constraints includes determining how many resources are available (or what the resource constraints are) for that specific time window. In some instances, if there are different resource constraints during the same sub time window, the resource constraints for the sub time window may be the largest amounts of constraints, or the least amount of availability, for that sub time window. For example, if a sub time window is a 30 minute time period, but for 10 minutes of that time period there are 2 CPUs available and for the other 20 minutes there is only 1 CPU available, the resource constraint for the sub time window may be that there is only 1 CPU available. In some instances, if there are different resource constraints during the same sub time window, another sub time window may be created. For instance, continuing the previous example, the 30 minute sub time window may be divided into two sub time windows, one for 10 minutes (when the 2 CPUs were available) and another for 20 minutes (when the 1 CPU was available).

In some embodiments, analyzing the utility execution plan against the resource constraints of the time window and sub time windows incudes estimating a sub-group execution time for each utility task sub-group based on the resource constraints for each sub time window. In some embodiments, the initial utility execution plan (for example, as generated in operation 160) may be based on an overall amount (for example, an average amount) of resources available during the time window. For example, there may be an average of 3 CPUs and 10 MB/s of resources during the time window. The order of execution for the utility tasks may be determined based on the overall amount of resources, in some instances. However, as discussed herein, there may not be a same amount of resources available for all time periods (e.g., sub time windows) within the time window, which may affect the planned execution times in the initial utility execution plan. For example, some utility tasks may finish executing faster and others may finish executing slower than the planned times, depending on how many resources are available during the moment (or moments) of execution. Therefore, in some instances, execution times may be estimated for each sub-group (referred to herein as sub-group execution times), which may increase the accuracy of the utility execution plan and the estimated execution times.

Estimating the sub-group execution time for each sub-group may include identifying each utility task within the sub-group, identifying how many resources are available to the sub-group during the sub time window (the sub-group executing during the sub time window), and determining how long it will take each utility task within the sub-group to execute with the amount of resources available. For example, a sub-group may include two parallel utility tasks (i.e., two utility tasks to be executed in parallel) and two individual utility tasks. In this example, if there are 4 CPUs available during the sub time window, 2 CPUs with parallel processing capabilities, the sub-group execution time may be, for example, 2 minutes. However, if, in another example, there are 4 CPUs available during the sub time window, but none of the CPUs for the specific time window have parallel processing, each of the utility tasks for the sub-group may need to be executed individually. In this example, the sub-group execution time may be, for example, 10 minutes, due to the lack of CPUs with parallel processing capabilities.

Method 100 includes operation 180 to generate a time window execution plan for each sub time window of the sub time windows. In some embodiments, each time window execution plan may be a part of the utility execution plan. In some embodiments, the time window execution plans may replace the initial utility execution plan (for example, as generated in operation 160). The time window execution plan may be a plan (e.g., schedule, order of execution, etc.) for executing the utility tasks within the sub time window. For instance, the time window execution plan may include the specific sub time window that it applies to, the utility tasks that are being executed during the sub time window, and which order (as well as whether to execute in parallel) the utility tasks should be executed in.

Figure 8:
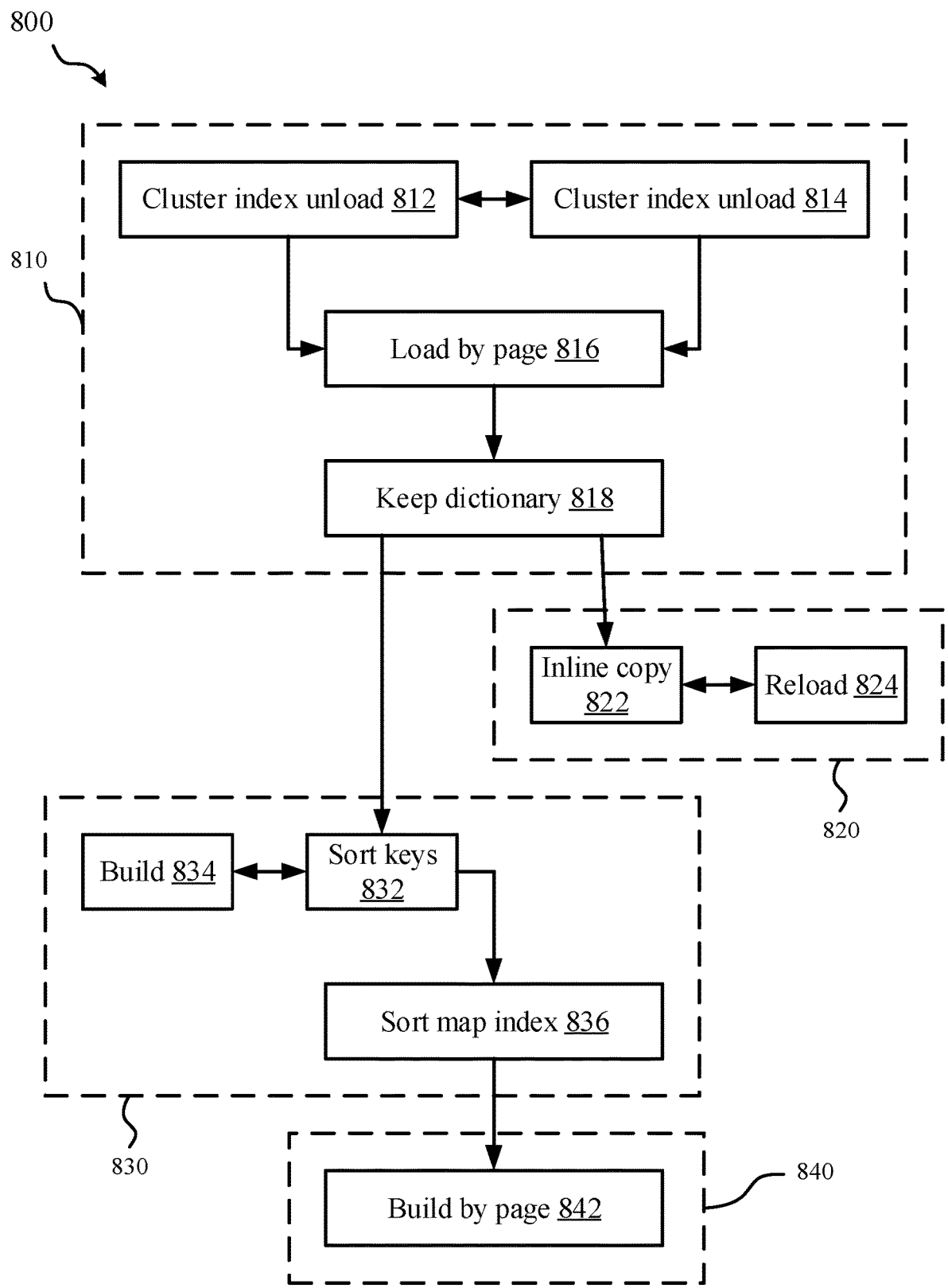
FIG. 8 depicts a block diagram of an example utility execution plan with a plurality of time window execution plans, according to some embodiments.

In some embodiments, generating the time window execution plan(s) may include adjusting the utility execution plan based on the sub-group execution times. For instance, if a sub-group execution time is greater than a corresponding predicted execution time (i.e., an execution time for the same utility tasks) in the initial utility execution plan, certain utility tasks may be moved to other sub-groups, shifted to parallel execution, removed, etc. in order to continue having the predicted execution time be less than or equal to the time window. In some embodiments, once the time window execution plans are generated for each sub time window, the utility execution plan may include a plurality of time window execution plans (for instance, one for each sub time window). FIG. 8 depicts an example utility execution plan 800 with a plurality of time window execution plans 810, 820, 830, and 840.

In some embodiments, method 100 is just one possible order of operations for planning an execution of the various utility tasks of a utility command. For instance, another example order of operations for planning the execution may include identifying the resources available (e.g., resource constraints) during each sub time window of the window—which might include starting a new sub time window whenever the available resources change or creating sub time windows of predetermined amounts (e.g., 30 minute periods)—and then identifying the preferred tasks and the input/output requirements of the preferred tasks. Then it may be identified or determined whether there are sufficient system resources (e.g., based on the degree of parallel) for parallel processing and whether the various preferred tasks can be executed in parallel (e.g., based on the compatibility and dependability of the tasks), and then, based on this, the tasks that can run in parallel may be identified. In some instances, the preferred tasks may be grouped into sub-groups based on the sub time windows and parallel execution and then the execution time of each sub-group may be identified. Then the execution plan may be generated (for instance, including the time window execution plans for each sub time window).

Figure 2:
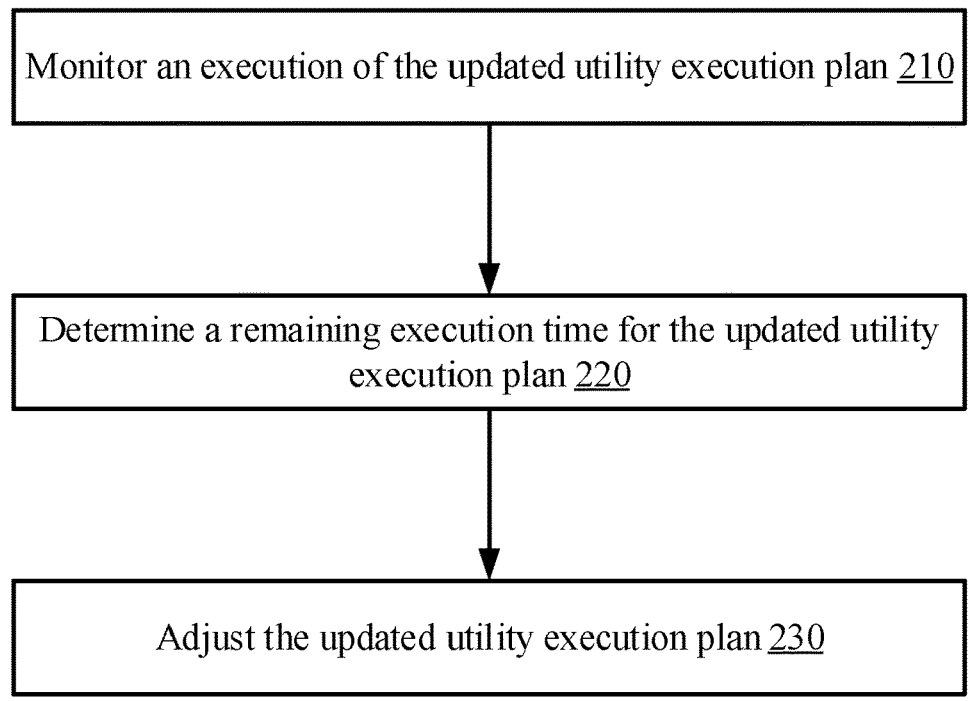
FIG. 2 depicts a flowchart of a set of operations for adjusting an execution plan for a utility command, according to some embodiments.

Referring to FIG. 2, a method 200 for adjusting an execution plan for a utility command is depicted, according to some embodiments. In some embodiments, method 200 may be a continuation of method 100 (FIG. 1). For example, method 200 may occur after operation 180 of method 100. In some embodiments, method 200 may occur after the updated utility execution plan has started executing (e.g., during the time window).

Method 200 includes operation 210 to monitor an execution of the updated utility execution plan. Monitoring the execution may include determining when the execution has started, whether or not the actual execution is on track with the updated utility execution plan, etc. In some instances, the actual execution (i.e., the execution of the utility command based on the updated utility execution plan during the time window) may be on track with the updated utility plan. In some instances, the actual execution may be behind the updated utility execution plan (i.e., the actual execution time, or times, is longer than the predicted execution times in the updated utility execution plan). In some instances, the actual execution may be ahead of the updated utility execution plan (i.e., the actual execution time is shorter than the predicted execution times in the updated utility execution plan).

Method 200 includes operation 220 to determine a remaining execution time for the updated utility execution plan. Determining the remaining execution time may include subtracting an executed time from the predicted execution time. The executed time may be the actual time of execution that has occurred during the time window. For example, the utility command may have been executing for 10 minutes so far during the time window, and the overall predicted execution time may be 1 hour. Therefore, in this example, the actual execution time may be 10 minutes and the remaining execution time may be 50 minutes.

Method 200 includes operation 230 to adjust the updated utility execution plan based on the remaining execution time. As discussed above, the actual execution of the utility command (during the time window) may be on track, ahead, or behind the updated utility execution plan. In some instances, the remaining execution time may be compared to the updated utility execution plan to determine how the actual execution compares to the plan. In some embodiments, if the actual execution is ahead of the updated utility execution plan (i.e., so there may be remaining time at the end of the time window), additional utility tasks may be added to the plan. In some embodiments, if the actual execution is behind the updated execution plan (i.e., so the utility command may not finish executing during the time window), certain utility tasks may be paused (or removed) and/or additional resources may be obtained so that the utility command can finish executing during the time window. Adjusting the updated utility command is further discussed herein and is depicted in FIG. 3.

Figure 3:
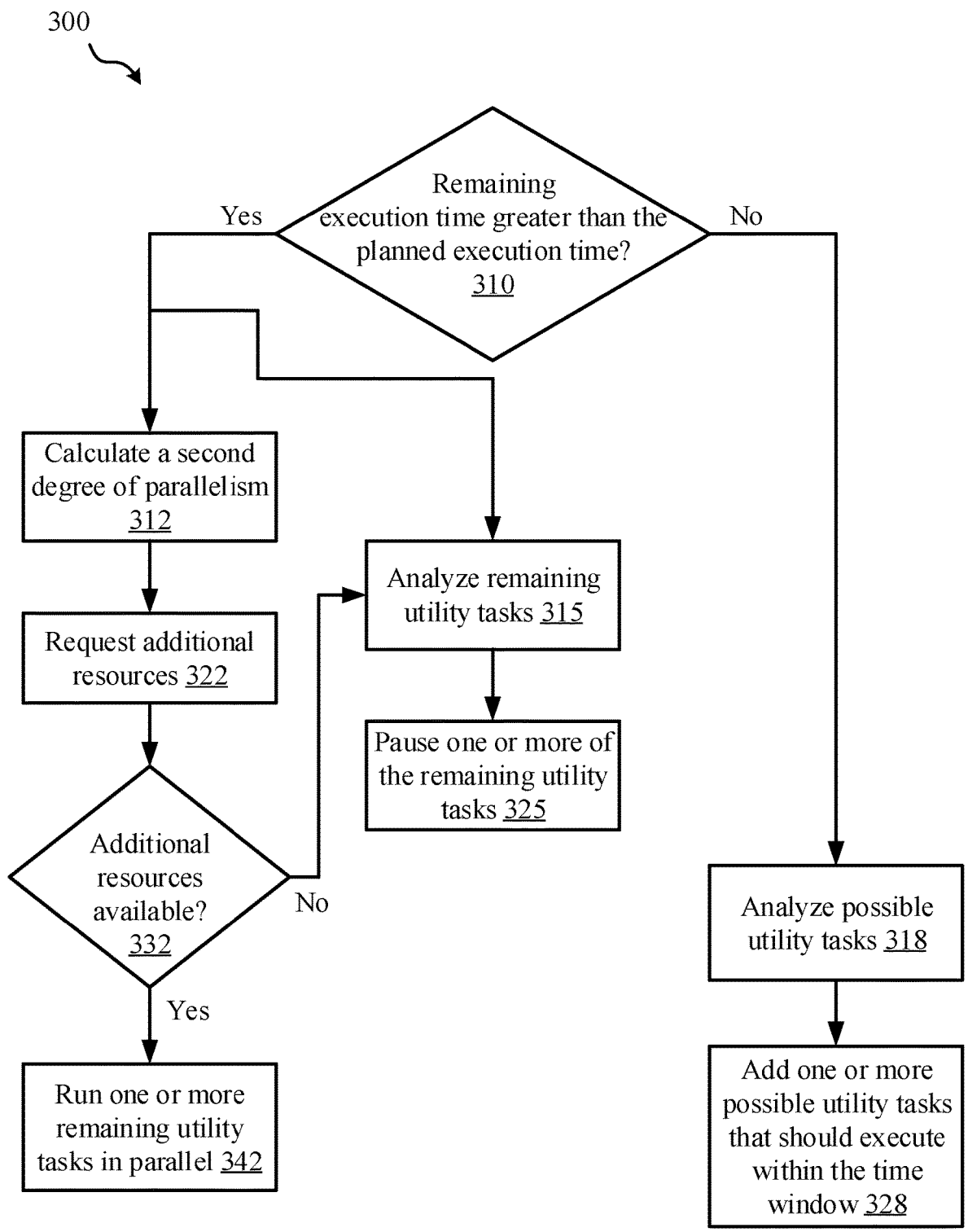
FIG. 3 depicts a flowchart of a set of operations for adjusting the updated utility execution plan, according to some embodiments.

Referring to FIG. 3, a method 300 for adjusting the updated utility execution plan is depicted, according to some embodiments. In some embodiments, method 300 may correspond to operation 230 (FIG. 2). Method 300 includes operation 310 to determine whether a remaining execution time of the time window execution plan is greater than the planned execution time for the remaining utility tasks. As discussed herein, if the actual execution is taking longer than what was planned, the plan may need to be adjusted in order to finish executing during the time window. Therefore, in some embodiments, the remaining execution time may be compared to the planned execution time for the remaining utility tasks (for example, the time allocated in the updated utility execution plan for executing the utility tasks that have not yet been executed) to determine whether the actual execution will be completed during the time window.

If the execution time is not greater than the planned execution time (for instance, so the actual execution time is less than the planned execution time), method 300 proceeds to operation 318 to analyze possible utility tasks. In this instance, the actual execution may be on track or even exceeding the plan, which may result in time (and possibly resources) remaining during the time window after the utility command has finished executing. Therefore, the possible utility tasks (i.e., as identified in operation 120 of FIG. 1) may be analyzed to determine whether or not more tasks should be added to the utility execution plan. In some instances, the possible utility tasks (that are not preferred utility tasks) that are added to the utility execution plan may be referred to as auxiliary tasks. For instance, certain additional utility tasks may increase the accuracy of various operations of the utility command and/or may be beneficial to the utility command in some way. For example, an additional utility task may result in additional data that, for example, may be used to further train a machine learning algorithm that is involved in the utility command, which may improve the accuracy of the machine learning algorithm. In some instances, analyzing the possible utility tasks may include identifying unselected utility tasks (i.e., tasks that were not selected as part of the utility execution plan). The unselected utility tasks may be analyzed to determine how they may affect the utility command. If some of the unselected utility tasks may improve the utility command (e.g., increase the accuracy, increase efficiency, etc.), then it may be beneficial to add some of the unselected utility tasks to the utility execution plan, even though they may not be necessary and/or preferred to successfully execute the utility command. If the unselected utility tasks do not benefit the utility command, it may be unnecessary to add any utility tasks to the plan, because they may simply use up time and resources without benefiting the system. The tasks that are added to the utility execution plan may be auxiliary tasks.

In some embodiments, analyzing the possible utility tasks may include determining the execution times of the unselected utility tasks. For instance, if the unselected utility task has an execution time longer than the unused time (for instance, the time in the time window that will remain after the utility command has executed), then adding the unselected utility task to the utility execution plan may cause the utility command execution to exceed the time window.

Method 300 includes operation 328 to add one or more possible utility tasks to updated utility execution plan. In some instances, the one or more possible utility tasks may only be added to the plan if they do not exceed the time window. In some embodiments, this may be based on the analyzing in operation 318. For example, the unselected utility task, or tasks, that benefit the utility command and that can be executed in a time less than (or equal to) the remaining time in the time window may be added to the utility execution plan. In some instances, degrees of parallelism may be determined for each of the unselected utility tasks to determine whether they are capable of parallel execution, and then the unselected utility tasks may be analyzed with respect to the preferred utility tasks and/or the utility tasks that are included in the execution plan to determine whether each of the unselected utility tasks can be executed in parallel with various utility tasks in the execution plan. In some instances, the available resources for the remaining time in the time window may be analyzed to determine how many resources, and which resources, may be available for executing any added utility tasks.

In some embodiments, if the execution time is greater than the planned execution time (in operation 310), method 300 proceeds to either operation 312 to calculate a second degree of parallelism for the remaining utility tasks or operation 315 to analyze the remaining utility tasks. In some embodiments, regulations or restrictions may be put in place for the system where additional resources may not be able to be acquired for the time window. In such instances, method 300 may proceed to operation 315. Operation 315 is discussed further herein. In some instances, a user (for example, a client, a developer, etc.) may designate whether to proceed to operation 312 and/or operation 315.

In some instances, method 300 proceeds from operation 310 to operation 312 to calculate a second degree of parallelism for each of the remaining utility tasks. The remaining utility tasks may be the utility tasks that are a part of the updated utility execution plan that have not yet been executed. For instance, method 300 may occur during the time window, therefore some of the utility tasks may already be executed/completed and other utility tasks may not have executed yet. These utility tasks may be the remaining utility tasks. In some instances, the degree of parallelism may have changed for the utility tasks based on which servers have been used to execute the various tasks in the time window and/or whether some servers have been used to execute other operations, commands, etc. for the computer system, therefore the second degree of parallelism is calculated to determine whether remaining utility tasks are capable of parallel execution at that time. In some instances, operation 140 (FIG. 1) may have calculated degrees of parallel for each preferred utility task, but additional tasks (e.g., auxiliary tasks) may be a part of the utility command that have not had degrees of parallelism determined for those tasks.

Calculating the second degree of parallelism for each of the remaining utility tasks may indicate whether any of the remaining utility tasks are capable of parallel execution. In some embodiments, after (or while) determining the second degrees of parallelism for the remaining tasks, method 300 may include determining whether the remaining utility tasks can execute in parallel. For instance, even if a remaining utility task has a degree of parallelism, if the remaining utility task is dependent on all the other remaining utility tasks, it may not be able to be executed in parallel with any of the other remaining utility tasks. Running the tasks in parallel may decrease in the execution time, as multiple utility tasks may be executed at the same time. However, parallel execution may require more resources than non-parallel execution, as more processing is occurring at one time.

Therefore, in some embodiments, method 300 includes operation 322 to request additional resources to enable more parallelism for the remaining utility tasks. If some of the remaining tasks can be executed in parallel, the server (e.g., a server that method 300 is executing on) may request additional resources from the system for the remaining time in the time window. If the system grants access to additional resources during the time left in the time window, some of the remaining tasks may be able to be executed in parallel, and the utility command may be able to finish executing during the time window.

Method 300 includes operation 332 to determine whether the computer system has additional resources available during the maintain window. In some embodiments, the system will respond to the server's request indicating whether or not the system has any additional resources it can allocate to the utility command execution. In some embodiments, if the system has additional resources available, the system will grant the server access to the additional resources.

If the computer system has additional resources available (in operation 332), method 300 may proceed to operation 342 to run one or more remaining utility tasks in parallel. In some embodiments, running the remaining utility tasks in parallel is in response to obtaining additional resources. In some instances, the utility execution plan is updated to show the additional parallel executions before the actual execution occurs. In some embodiments, the one or more remaining utility tasks that are run in parallel are the remaining utility tasks that are able to be executed in parallel (based on the degree of parallelism) without exceeding the time window.

In some embodiments, method 300 ends after operation 342. In some embodiments, after operation 342 method 300 may proceed (not depicted) to operation 315 to analyze the remaining tasks. For instance, if the remaining execution time is significantly more than the planned execution time, some remaining utility tasks may need to be executed in parallel (e.g., in operation 342) and some remaining utility tasks may need to be paused (e.g., in operation 325) in order to have the utility command finish executing during the time window.

In some embodiments, if the computer system does not have any additional resources available (in operation 332), method 300 proceeds to operation 315 to analyze the remaining tasks. As discussed herein, in some embodiments method 300 may proceed directly from operation 310 to operation 315.

In some embodiments, analyzing the remaining utility tasks (operation 315) may include determining how necessary and/or beneficial each of the remaining utility tasks are to the utility command, the operations of the utility command, and the necessary functions of the utility command. For example, some of the utility tasks may increase accuracy of the utility command (or may have some other benefit to the utility command), but may not be necessary to simply execute the utility command (for example, may not perform any of the necessary functions of the utility command). In some embodiments, the remaining utility tasks that are not necessary to execute the utility command may be flagged as unnecessary utility tasks. In some instances, the unnecessary utility tasks may be compared and organized from least unnecessary to most unnecessary, or vice versa (for instance, based on the analyzing).

Method 300 includes operation 325 to pause one or more of the remaining utility tasks. In some embodiments, the most unnecessary utility task, or tasks, may be paused. If the pausing of the one remaining utility task is enough to finish executing the utility command within the time window, no other utility tasks may be paused, in some instances. If there is still not enough time in the time window to finish executing the utility command, the next most unnecessary utility task may also be paused. This may continue until the un-paused remaining utility tasks can finish executing during the time window. In some instances, if there is remaining time in the time window after all the un-paused remaining utility tasks are executed, one or more of the paused utility tasks may be un-paused so that they will execute during the remaining time left in the time window.

Figure 4:
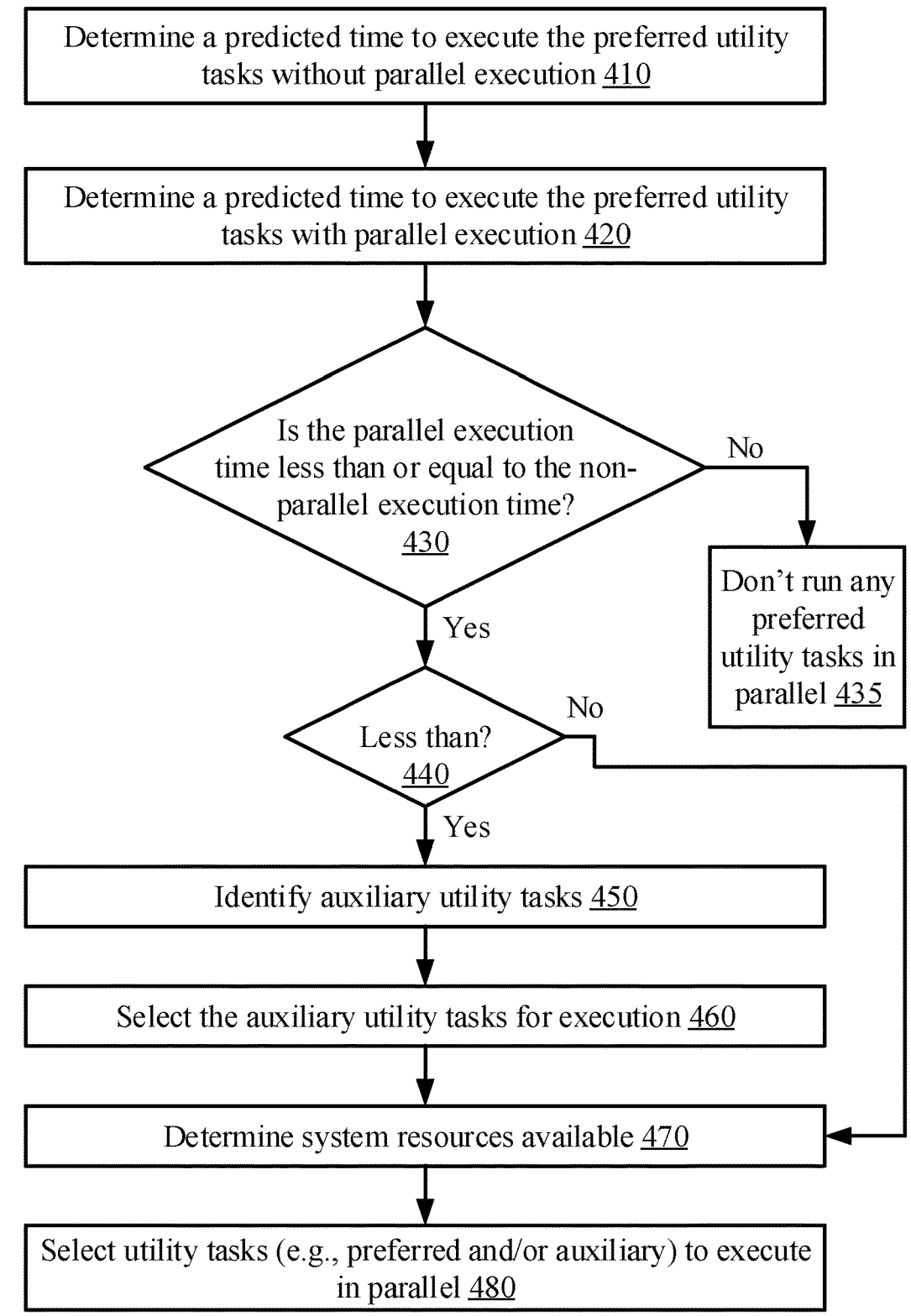
FIG. 4 depicts a flowchart of a set of operations for generating a utility execution plan, according to some embodiments.

Referring to FIG. 4, a method 400 for generating a utility execution plan is depicted, according to some embodiments. In some embodiments, method 400 corresponds to operation 162 (FIG. 1). Method 400 includes operation 410 to determine a predicted time to execute the preferred utility tasks without parallel execution. This may be referred to herein as the non-parallel execution time. Determining the non-parallel execution time may include adding the estimated execution times (discussed herein) for each preferred utility task. For example, a first preferred utility task may have an estimated execution time of 30 seconds, a second preferred utility task may have an estimated execution time of 10 seconds, a third preferred utility task may have an estimated execution time of 15 seconds, and a fourth preferred utility task may have an estimated execution time of 5 seconds. Therefore, in this example, the non-parallel execution time may be 60 seconds.

Method 400 includes operation 420 to determine a predicted time to execute the preferred utility tasks with parallel execution. This may be referred to herein as a parallel execution time. For parallel execution, the preferred utility tasks may be executed in parallel based on the degree of parallelism and the compatibility/dependence between the preferred utility tasks (for instance, determined by analyzing possible relationships, inputs/outputs, etc. of each preferred utility task). The execution time of the preferred utility tasks that cannot be executed in parallel (due to the degree of parallelism and/or relationships to other preferred utility tasks) may still be counted in the parallel execution time, it just may be the same execution time (for the specific preferred utility task) as the non-parallel execution time. For example, if a preferred utility task has a zero degree of parallelism (indicating that it cannot be executed in parallel because it does not have access to a server with parallel execution capabilities) and the predicted execution time to execute the preferred utility task not in parallel with any other tasks is 15 seconds, then the 15 second execution time for that specific preferred utility task is included in the calculation of the parallel execution time.

In some instances, determining the parallel execution time may include determining which preferred utility tasks can be executed in parallel, estimating a parallel execution time for each parallel execution, adding the estimated parallel execution times, and adding the estimated execution times for the utility tasks that cannot be run in parallel to the estimated parallel execution times. For example, continuing the example above, the second and third preferred utility tasks may be able to be executed in parallel (e.g., based on the degree(s) of parallelism). In this example the estimated parallel execution time (for the second and third tasks executing in parallel) may be 20 seconds. The first and fourth preferred execution tasks (with estimated execution times of 30 seconds and 5 seconds, respectively) may not have the capability to be executed in parallel. Therefore, in this example, the parallel execution time may be 55 seconds.

Method 400 includes operation 430 to determine whether the parallel execution time is less than or equal to the non-parallel execution time (for example, by comparing the parallel execution time to the non-parallel execution time).

If the parallel execution time is not less than or equal to (i.e., is greater than) the non-parallel execution time, method 400 may proceed to operation 435 to not run any preferred utility tasks in parallel. In this instance, it may take a longer time to run the tasks in parallel and may take an increased amount of resources (for instance, because parallel execution may use up more resources due to the increased amount of processing at one time). This may not help make sure the utility command executes within the time window, because it may add time and resources. Therefore, when the non-parallel execution time is smaller (i.e., it takes less time to execute the utility tasks one by one), then the preferred utility tasks may all be run individually in a non-parallel format.

If the parallel execution time is less than or equal to the non-parallel execution time, method 400 may proceed to operation 440 to determine whether parallel execution time is less than the non-parallel execution time (i.e., not equal to the non-parallel execution time). For example, if the parallel execution time and the non-parallel execution time are equal, then it may not be beneficial (depending on the circumstances) to run the tasks in parallel, because it may use up additional resources without saving any time. Therefore, in some embodiments, if the parallel execution time is not less than (i.e., is equal to) the non-parallel execution time, method 400 may proceed to operation 470 to determine which system resources are available. System resources may include central processing units (CPUs) and/or memory. For instance, if there are enough system resources available, then the utility tasks may still be executed in parallel, as there may still be a chance that the parallel execution ends up being faster than the non-parallel execution (event though it may not be predicted to be faster). Operation 470 is discussed further herein.

In some instances (not depicted), if the parallel execution time is less than the non-parallel execution time (in operation 440), method 400 may proceed to operation 470 to determine the system resources that are available during the time window. The amount of system resources available may limit how many utility commands may be executed in parallel (as parallel execution may use up more resources). If there are enough resources available to execute all eligible utility tasks in parallel (i.e., the preferred utility tasks that are able to be executed in parallel based on the degrees of parallelism), then all eligible utility tasks may be selected (in operation 480). If there are not enough resources to execute all eligible utility tasks in parallel (in operation 470), then the parallel utility tasks that save the most time by being executed in parallel may be selected as the utility tasks to be executed in parallel (in operation 480).

In some embodiments, if the parallel execution time is less than the non-parallel execution time (in operation 440), and the non-parallel execution time is less than (i.e., faster/quicker than) the time window, method 400 may proceed to operation 450 to identify additional utility tasks (or auxiliary utility tasks) from the possible utility tasks for the utility command. The additional tasks may be the tasks that were not preferred for achieving necessary functions and/or tasks that achieved functions (for the operations of the utility command) that were not necessary to the utility command. These additional utility tasks may be referred to herein as auxiliary utility tasks. In some instances, the auxiliary utility tasks may be able to be executed in parallel with the preferred utility tasks without adding additional time (or adding minimal additional time) for execution. In these instances, it may be beneficial to add additional utility tasks (i.e., the auxiliary tasks) in order to improve (for example, increase accuracy, efficiency, etc.) the utility command. For example, an auxiliary utility task may add more data to the utility command, which may increase the accuracy of the utility. In some embodiments, identifying the auxiliary utility tasks may include determining additional utility tasks that can be executed in parallel with one or more the preferred utility tasks (for instance, based on degrees of parallelism and relationships (e.g., dependencies) between utility tasks). In some embodiments, an updated parallel execution time, or times, for the utility tasks (including the auxiliary utility tasks) may be determined. For example, the parallel execution time for the preferred utility tasks may be 55 seconds and then the second parallel execution time with some added auxiliary utility tasks may be 56 seconds.

Method 400 includes operation 460 to select the auxiliary utility tasks for execution. In some embodiments, the auxiliary tasks are selected based on the updated parallel execution times. For instance, if certain auxiliary tasks cause an increase in parallel execution time, they may not be selected for execution. In some instances, if auxiliary tasks do not change the parallel execution time, they may be selected for execution. In some embodiments, the preferred utility tasks and the auxiliary utility tasks that are selected for execution (for example, to be included in the execution plan) may be referred to as selected utility tasks.

Method 400 includes operation 470 to determine the system resources that are available for executing the utility command. These system resources may be referred to as available system resources. In some embodiments, the available system resources may include a number of available CPUs and/or an amount of available memory. Determining the system resources that are available may include determining which resources, and how much of each resource, are available during the time window, for example, based on analyzing the computer system.

Method 400 includes operation 480 to select one or more utility tasks (for example, from the preferred utility tasks and/or the auxiliary utility tasks) to execute in parallel. In some embodiments, selecting one or more utility tasks to execute in parallel may include determining how many of the possible parallel executions can execute without exceeding the system resources available (i.e., so that there are not enough resources to execute all the utility tasks in the utility execution plan) and without exceeding the time window. The utility tasks that are able to be executed in parallel without exceeding the available system resources and exceeding the time window may be selected to execute in parallel.

Figure 5:
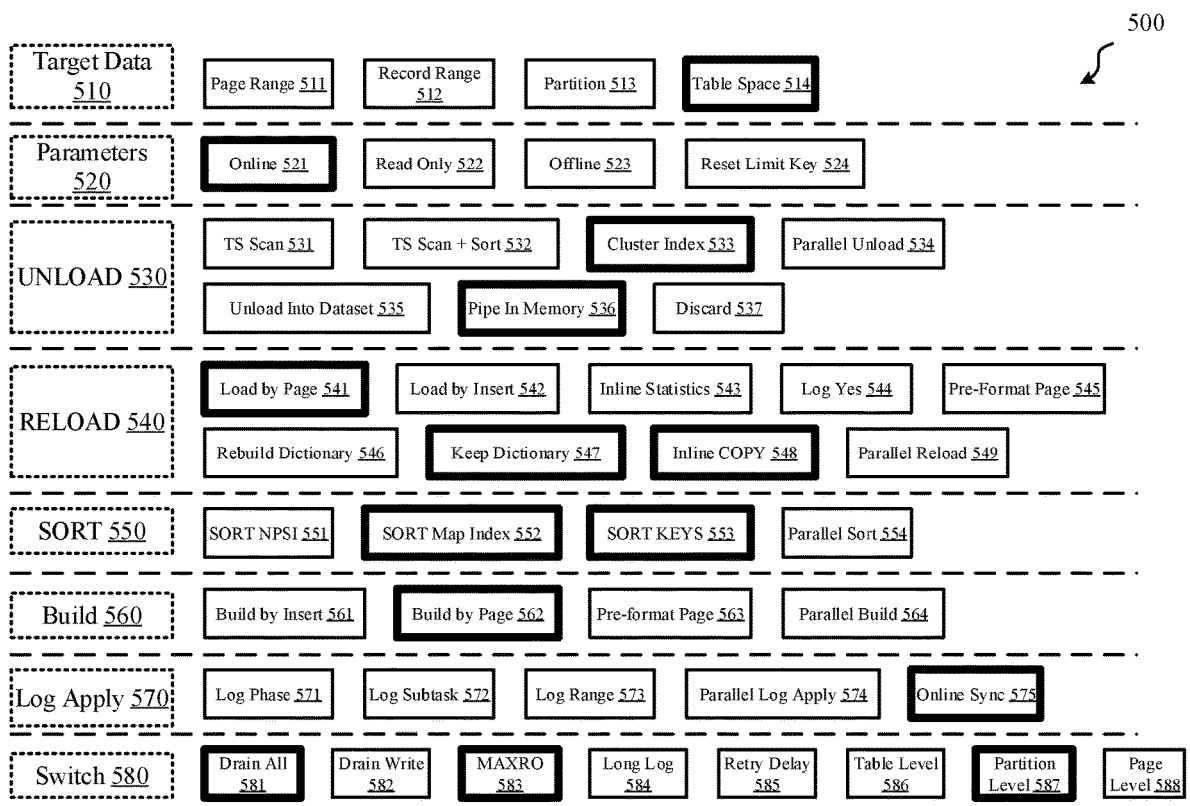
FIG. 5 depicts a schematic diagram of example utility tasks for a reorganization utility command, according to some embodiments.

Referring to FIG. 5, a schematic diagram of an example utility command 500 and its possible utility tasks is depicted, according to some embodiments. In this example, the utility command 500 is a reorganization command to reorganize data tables in the system. The reorganize utility command 500 includes multiple operations such as identifying the target data (target data 510), identifying parameters of the data and/or data table (parameters 520), unloading the data (unload 530), reloading the data (reload 540), sorting the data (sort 550), building the new data table (build 560), performing log apply services to apply redo data (log apply 570), and switching the reorganized data table with the original data table (switch 580). In some embodiments, each of these operations are necessary to execute a reorganization utility command 500.

In some embodiments, each operation has a variety of possible utility tasks that could be used to perform the operation (for example, by performing the one or more functions of the operation). For instance, the target data operation 510 has possible utility tasks of a desired page range for the reorganized table (page range 511), a desired record range for the reorganized data table (record range 512), a desired number of partitions in the reorganized data table (partitions 513), and a desired amount of table space in the reorganized data table (table space 514). For reorganization command 500, table space 514 has been selected as the preferred utility task. In some instances, table space 514 may perform the necessary function (or functions) for the target data operation 510. The selected utility tasks (for example, the preferred utility tasks and the auxiliary utility tasks) are outlined in bold in FIG. 5.

Parameters operation 520 has possible utility tasks including identifying a system that is online (online 521), identifying a system that is offline (offline 523), identifying a read only data table (read only 522), and identifying limit keys that can be changed/reset (reset limit key 524). In example reorganization command 500, online 521 has been selected as the preferred utility task. For example, the system may need to be online in order to switch out the old data table with the reorganized data table (for switch operation 580).

The unload operation 530 of the reorganization utility command 500 has possible utility tasks including TS scan 531, TS scan and sort 532, cluster index 533, parallel unload 534, unload into dataset 535, pipe in memory 536, and discard 537. In this example, cluster index 533 and pipe in memory 536 are the selected utility tasks. In some instances, both cluster index 533 and pipe in memory 536 may be preferred utility tasks (for instance, to perform necessary functions of the unload operation 530). In some instances, one or more of the utility tasks 533 and 536 may be auxiliary utility tasks. In some instances, cluster index 533 and pipe in memory 536 may be executed in parallel (based on the degree of parallelism and a lack of relationships (e.g., dependency) between the two tasks 533 and 536).

The reload operation 540 has possible utility tasks including load by page 541, load by insert 542, inline statistics 543, log yes 544, pre-format page 545, rebuild dictionary 546, keep dictionary 547, inline copy 548, and parallel reload 549. In some instances, parallel reload 549 is a second reload operation that can be executed in parallel to any of the other possible utility tasks (541-548) for the reload operation 540. For reorganization utility command 500, load by page 541, keep dictionary 547, and inline copy 548 have all been selected for the utility execution plan. In some instances, load by page 541, keep dictionary 547, and inline copy 548 are all preferred utility tasks. In some instances, one or more of these utility tasks may be auxiliary utility tasks (i.e., not necessary and/or preferred to execute the utility command) that may improve the utility command, may execute in parallel with other utility commands without increasing the execution time, etc.

The sort operation 550 has possible utility tasks including sort NPSI 551, sort map index 552, sort keys 553, and parallel sort 554. Sort map index 552 and sort keys 553 have been selected as utility tasks for the utility execution plan. The build operation 560 has possible utility tasks including build by insert 561, build by page 562, pre-format page 563, and parallel build 564. Build by page 562 has been selected as the preferred utility task for the build operation 560, in this instance. The log apply operation 570 has possible utility tasks including log phase 571, log subtask 572, log range 573, parallel log apply 574, and online sync 575. Online sync 575 has been selected as the preferred utility task for the log apply operation 570. The switch operation 580 has possible utility tasks including drain all 581, drain write 582, MAXRO 583, long log 584, retry delay 585, table level 586, partition level 587, and page level 588. Drain all 581, MAXRO 583, and partition level 587 have all been selected as utility tasks for the utility execution plan. In some instances, all three utility tasks (581, 583, and 587) may be preferred utility tasks. In some instances, one or more of the utility tasks (581, 583, and 587) may be auxiliary utility tasks that are still added to the utility execution plan (for example, because they improve the utility command).

All the selected utility tasks (table space 514, online 521, cluster index 533, pipe in memory 536, load by page 541, keep dictionary 547, inline copy 548, sort map index 552, sort keys 553, build by page 562, online sync 575, drain all 581, MAXRO 583, and partition level 587) may be included in the utility execution plan.

Figure 6:
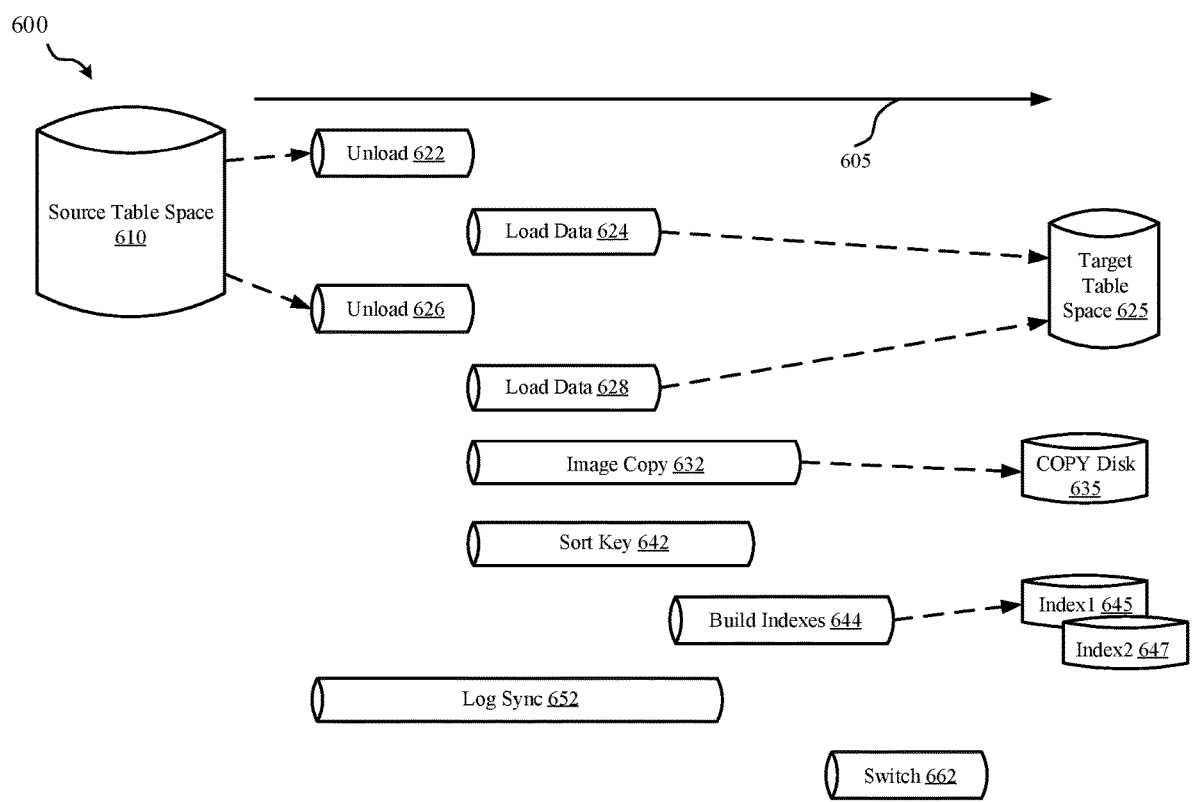
FIG. 6 depicts a schematic diagram of a timeline for executing various utility tasks for a utility command, according to some embodiments.

Referring to FIG. 6, a schematic diagram of an execution timeline 600 for executing various utility tasks for a utility command is depicted, according to some embodiments. In some embodiments, the various utility tasks may include only preferred utility tasks. In some embodiments, the various utility tasks may include a combination of preferred utility tasks and auxiliary utility tasks. In some embodiments, execution timeline 600 may be a schematic representation of how the utility tasks are executed. Execution timeline 600 may depict the execution of a reorganization utility command (for example with possible utility operations as depicted in FIG. 5). The reorganization utility command, in this example execution timeline 600, has an input including source table space 610 (e.g., the original table space that is being reorganized) and outputs including target table space 625 (e.g., the table space after it is reorganized), copy disk 635 (e.g., a copy of the source table space 610), and indexes 1 645 and 2 647 (for example, including two database keys for the target table space 625, or a database key for the source table space 610 (in index1 645) and a database key for the target table space 625 (in index2 647)).

The reorganization utility command may be executed during a time window 605 and may have utility tasks including unload 622, load data 624, unload 626, load data 628, image copy 632, sort key 642, build indexes 644, log sync 652, and switch 662. The utility tasks unload 622, unload 626, and log sync 652 are all executed in parallel. For instance, unload task 622 may unload data from columns 1-5 of the source table space 610 and unload task 626 may unload data from columns 6-10, therefore unload task 622 and 626 may be executed in parallel because they are not dependent on each other. Load data 624 may load the data that was unloaded in task 622 that is remaining in the data table into target table space 625. Load data 628 may load the data that was unloaded in task 626 into target table space 625. Load data 624 and 628 may not execute in parallel with unload tasks 622 and 626 because load data 624 and 628 depends on unload tasks 622 and 626, in some instances.

In some instances, the log sync task 652 may sync the log file with the source table space 610. Because this task does not depend on either of the unload task 622 and 626, log sync task 652 may be run in parallel with both tasks. Log sync task 652 takes longer to execute (i.e., takes a longer time during the time window 605) than the unload tasks 622 and 626, so log sync 652 may also run in parallel (e.g., at the same time) with the load data 624, load data 628, image copy 632, sort key 642, and build indexes 644.

Image copy task 632 may copy the unloaded data (from unload task 622 and 626) into copy disk 635. Because image copy task 632 is dependent on unload tasks 622 and 626, it may not be executed in parallel with the unload task 622 and 626. The sort key task 642 may sort the various data needed for the indexes (index1 645 and index2 647). In some embodiments, sort key 642 and build indexes 644 may be able to execute in parallel. However, there may not be enough resources available during the time window 605 to execute tasks 642 and 644 in parallel along with all the other tasks (e.g., 624, 628, and 632). Therefore, in execution timeline 600, the build indexes task 644 may start executing after both load data tasks 624 have concluded (and additional resources become available).

Switch task 662 may switch the source table space 610 with the reorganized table (target table space 625). In some instances, switch task 662 may be able to execute any time after load data tasks 624 and 628 have executed (for example, forming target table space 625). However, in some instances, as depicted, there may not be enough available resources at that time in the time window 605 to execute the switch task 662, therefore switch task 662 may be paused (or may not be started) until enough resources become available.

Referring to FIG. 7, a schematic diagram of a graph 700 of available resources 710 during various sub time windows throughout a maintain window is depicted, according to some embodiments. The time window, or maintain window, may span from 12:00 AM to 4:00 AM, in this example. Before the time window, there may be 1 CPU of resources available. From 12:00 AM to 1:00 AM, there are 2 CPUs available to execute the utility command. The 2 CPUs are the available resources 710, at this instance. 12:00 AM-1:00 AM is the first sub time window 715, in this example. At 1:00 AM, the amount of available resources 710 increases to 4 CPU. Therefore, starting at 1:00 AM, more utility tasks may be executed in parallel, the utility tasks may be executed more quickly, and/or additional utility tasks can be added to the utility execution plan during this time period, due to the additional resources. At 3:00 AM, the amount of available resources may return to 2 CPU. The second sub window 725 of the time window is from 1:00 AM to 3:00 AM due to the amount of available resources 710 (4 CPU) during this time period. At 3:00 AM, a third sub time window 735 may begin, because there is a new amount of available resources 710 (2 CPU). The third sub time window 735 is from 3:00 AM-4:00 AM. In some instances, the time window may end at 4:00 AM.

Referring to FIG. 8, an example utility execution plan 800 with time window execution plans is depicted, according to some embodiments. Utility execution plan 800 may be for a reorganization utility command, in some embodiments. Utility execution plan 800 includes utility tasks cluster index unload 812, cluster index unload 814, load by page 816, keep dictionary 818, inline copy 822, reload 824, sort keys 832, build 834, sort map index 836, and build by page 842. Utility execution plan 800 includes time window execution plan 810, time window execution plan 820, time window execution plan 830, and time window execution plan 840. In some embodiments, each time window execution plan 810, 820, 830, and 840 is for a different sub time window of the time window. For example, time window execution plan 810 may occur during a first sub time window, time window execution plan 820 may occur during a second sub time window, time window execution plan 830 may occur during a third sub time window, and time window execution plan 840 may occur during a fourth sub time window.

Time window execution plan 810 includes a cluster index unload task 812 and a cluster index unload task 814 that execute in parallel. The outputs of both cluster index unloads 812 and 814 may be inputted into load by page task 816. After load by page task 816 is finished executing, the keep dictionary task 818 is executed. The execution of keep dictionary task 818 is the last task of the first sub time window.

Time window execution plan 820 occurs during the second sub time window, and includes an inline copy task 822 and a reload task 824 that are run in parallel. In some embodiments, the first sub time window may have more resources available than the second sub time window, so more utility tasks may be executed in time window execution plan 810 compared to time window execution plan 820.

Time window execution plan 830 occurs during a third sub time window, and includes a build task 834, a sort keys task 832, and a sort map index task 836. The build task 834 and the sort keys task 832 are executed in parallel. In some embodiments, the third sub time window has more resources available than the second time window but fewer resources available than the first time window. In some embodiments, the third sub time window may have the most resources available, but one or more of the utility tasks (build 834, sort keys 832, and/or sort map index 836) may require more resources to execute, therefore time window execution plan 830 may include less utility tasks than time window execution plan 810.

Time window execution plan 840 occurs during a fourth sub time window, and includes a build by page task 842. In some embodiments, as depicted, build by page task 842 may be the only task in time window execution plan 840. In some embodiments, there may be additional time remaining in the time window, therefore additional utility tasks (not depicted) may be added to time window execution plan 840 (for example, in task 328 of FIG. 3).

Figure 9:
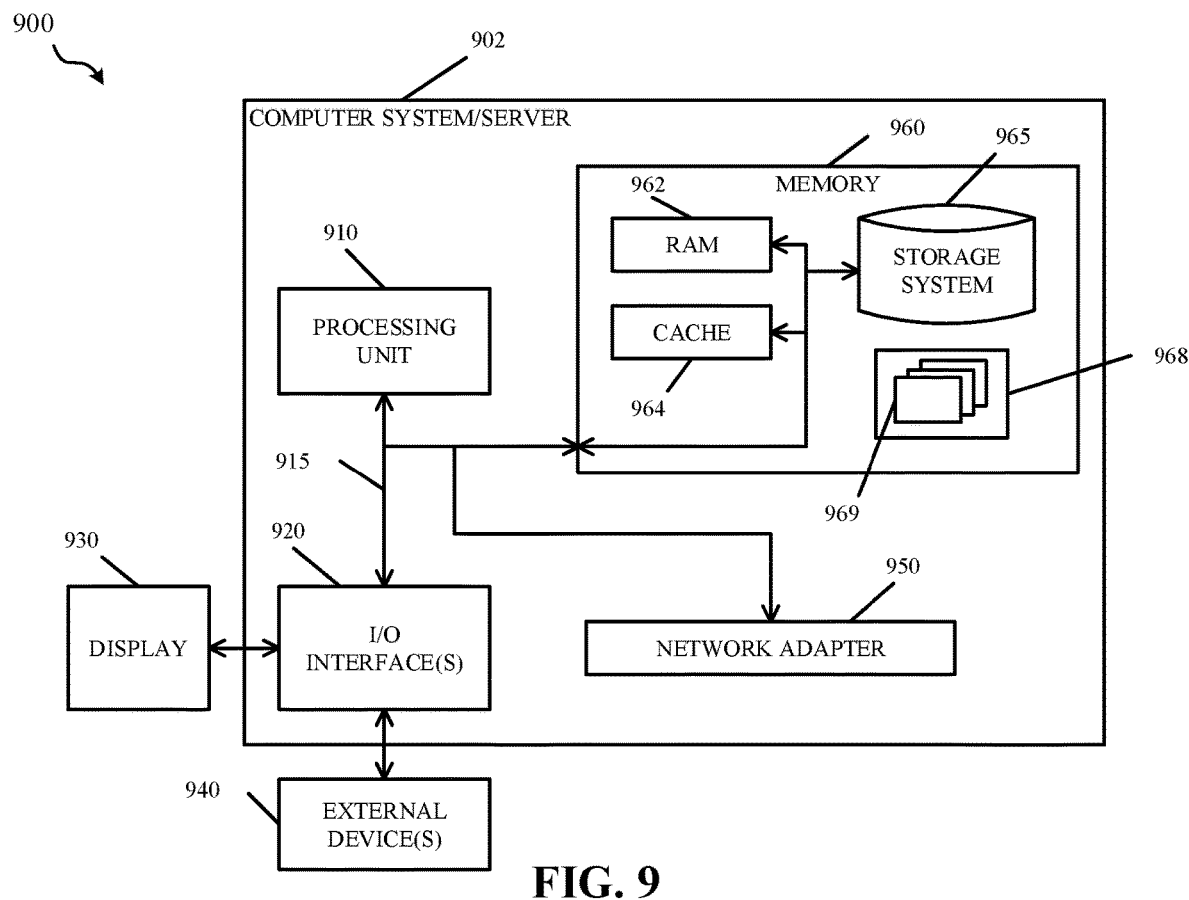
FIG. 9 depicts a block diagram of an example computer system environment, according to some embodiments.

Referring to FIG. 9, computer system 900 is a computer system/server 902 is shown in the form of a general-purpose computing device, according to some embodiments. In some embodiments, computer system/server 902 is located on the linking device. In some embodiments, computer system/server 902 is connected to the linking device. The components of computer system/server 902 may include, but are not limited to, one or more processors or processing units

910, a system memory 960, and a bus 915 that couples various system components including system memory 960 to processor 910.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 960 can include computer system readable media in the form of volatile memory, such as random-access memory (RAM) 962 and/or cache memory 964. Computer system/server 902 may further include other removable/non-removable, volatile/non-volatile computer system storage media. By way of example only, storage system 965 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 960 may include at least one program product having a set (e.g., at least one) of program modules that are configured to carry out the functions of embodiments of the disclosure.

Program/utility 968, having a set (at least one) of program modules 969, may be stored in memory 960 by way of example, and not limitation, as well as an operating system, one or more application programs, other program modules, and program data. Each of the operating system, one or more application programs, other program modules, and program data or some combination thereof, may include an implementation of a networking environment. Program modules 969 generally carry out the functions and/or methodologies of embodiments of the invention as described herein.

Computer system/server 902 may also communicate with one or more external devices 940 such as a keyboard, a pointing device, a display 930, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 920. Still yet, computer system/server 902 can communicate with one or more networks such as a local area network (LAN), a general wide area network (WAN), and/or a public network (e.g., the Internet) via network adapter 950. As depicted, network adapter 950 communicates with the other components of computer system/server 902 via bus 915. It should be understood that although not shown, other hardware and/or software components could be used in conjunction with computer system/server 902. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a utility command;
   identifying possible utility tasks used to execute the utility command;
   determining preferred utility tasks from the possible utility tasks for each necessary function of the utility command;
   calculating a degree of parallelism for the preferred utility tasks;
   generating a utility execution plan for the utility command based on the preferred utility tasks and the degree of parallelism;
   analyzing the utility execution plan against resource constraints of a time window and sub time windows of the time window, wherein the utility command will be executed in the time window;
   generating a time window execution plan for each sub time window of the sub time windows; and
   updating the utility execution plan with the time window execution plans, resulting in an updated utility execution plan.

2. The method of claim 1, wherein determining preferred utility tasks from the possible utility tasks comprises:
   calculating an estimated execution time for each of the possible utility tasks;
   analyzing a set of operations for the utility command;
   determining one or more necessary functions of the utility command based on the analyzing;
   identifying data inputs for the set of operations of the utility command based on the analyzing; and
   selecting utility tasks for each of the one or more necessary functions of the set of operations based on the data inputs and the estimated execution time.

3. The method of claim 1, wherein generating the utility execution plan for the utility command comprises:
   determining a first predicted time to execute the preferred utility tasks in a non-parallel execution, resulting in a non-parallel execution time;
   determining a second predicted time to execute the preferred utility tasks in a parallel execution, wherein eligible preferred utility tasks are executed in parallel based on at least the degree of parallelism, resulting in a parallel execution time;
   comparing the non-parallel execution time to the parallel execution time;
   determining system resources available for executing the utility command, resulting in available system resources; and
   selecting one or more preferred utility tasks to execute in parallel, based on the comparing and the available system resources.

4. The method of claim 3, further comprising:
   in response to determining that the parallel execution time is less than the non-parallel execution time, wherein the non-parallel execution time is less than the time window, identifying one or more auxiliary utility tasks from the possible utility tasks; and
   selecting the one or more auxiliary utility tasks for execution.

5. The method of claim 3, further comprising:
analyzing the non-parallel execution time and the available system resources;
determining whether the available system resources can execute the one or more utility tasks in an execution time less than or equal to the non-parallel execution time;
analyzing the parallel execution time and the available system resources; and
determining whether the available system resources can execute the preferred utility tasks in parallel in an execution time less than or equal to the parallel execution time.

6. The method of claim 3, wherein the available system resources comprise at least one of:
a number of available central processing units and an amount of available memory.

7. The method of claim 1, wherein analyzing the utility execution plan against the resource constraints of the time window and the sub time windows of the time window comprises:
arranging utility tasks in the utility execution plan based on the sub time windows, resulting in utility task sub-groups;
analyzing the resource constraints for each sub time window from the sub time windows; and
estimating a sub-group execution time for each utility task sub-group from the utility task sub-groups based on the resource constraints for each sub time window.

8. The method of claim 1, further comprising:
monitoring an execution of the updated utility execution plan;
determining a remaining execution time for the updated utility execution plan; and
adjusting the updated utility execution plan based on the remaining execution time.

9. The method of claim 8, wherein adjusting the updated utility execution plan comprises:
determining that the remaining execution time is greater than a planned execution time;
calculating a second degree of parallelism for remaining utility tasks;
requesting additional resources to enable more parallelism for the remaining utility tasks; and
in response to obtaining additional resources, running one or more of the remaining utility tasks in parallel.

10. The method of claim 8, wherein adjusting the updated utility execution plan comprises:
determining that the remaining execution time is greater than a planned execution time;
analyzing remaining utility tasks in the time window execution plan; and
pausing one or more of the remaining utility tasks, wherein the one or more of the remaining utility tasks are auxiliary utility tasks.

11. The method of claim 8, wherein adjusting the updated utility execution plan comprises:
determining that the remaining execution time is less than a planned execution time;
analyzing the possible utility tasks; and
adding one or more auxiliary utility tasks from the possible utility tasks to the time window execution plan.

12. A system having one or more computer processors, the system configured to:
receive a utility command;
identify possible utility tasks used to execute the utility command;
determine preferred utility tasks from the possible utility tasks for each necessary function of the utility command;
calculate a degree of parallelism for the preferred utility tasks;
analyze the preferred utility tasks against resource constraints of a time window and sub time windows of the time window, wherein the utility command will be executed in the time window; and
generate a utility execution plan for the utility command based on the preferred utility tasks, the degree of parallelism, and the resource constraints.

13. The system of claim 12, wherein determining preferred utility tasks from the possible utility tasks comprises:
calculating an estimated execution time for each of the possible utility tasks;
analyzing a set of operations for the utility command;
determining one or more necessary functions of the utility command based on the analyzing;
identifying data inputs for the set of operations of the utility command based on the analyzing; and
selecting utility tasks for each of the one or more necessary functions of the set of operations based on the data inputs and the estimated execution time.

14. The system of claim 12, wherein generating the utility execution plan for the utility command comprises:
determining a first predicted time to execute the preferred utility tasks in a non-parallel execution, resulting in a non-parallel execution time;
determining a second predicted time to execute the preferred utility tasks in a parallel execution, wherein eligible preferred utility tasks are executed in parallel based on at least the degree of parallelism, resulting in a parallel execution time;
comparing the non-parallel execution time to the parallel execution time;
determining system resources available for executing the utility command, resulting in available system resources; and
selecting one or more preferred utility tasks to execute in parallel, based on the comparing and the available system resources.

15. The system of claim 12, further configured to:
monitor an execution of the utility execution plan;
determine a remaining execution time for the utility execution plan; and
adjust the utility execution plan based on the remaining execution time.

16. The system of claim 15, wherein adjusting the updated utility execution plan comprises:
determining that the remaining execution time is greater than a planned execution time;
calculating a second degree of parallelism for remaining utility tasks;
requesting additional resources to enable more parallelism for the remaining utility tasks; and
in response to obtaining additional resources, running one or more of the remaining utility tasks in parallel.

17. A computer program product comprising a computer readable storage medium having program instructions embodied therewith, the program instructions executable by a server to cause the server to perform a method, the method comprising:
receiving a utility command;
identifying possible utility tasks used to execute the utility command;

determining preferred utility tasks from the possible utility tasks for each necessary function of the utility command;

calculating a degree of parallelism for the preferred utility tasks;

generating a utility execution plan for the utility command based on the preferred utility tasks and the degree of parallelism;

analyzing the utility execution plan against resource constraints of a time window and sub time windows of the time window, wherein the utility command will be executed in the time window;

generating a time window execution plan for each sub time window of the sub time windows; and updating the utility execution plan with the time window execution plans, resulting in an updated utility execution plan.

18. The computer program product of claim 17, wherein determining preferred utility tasks from the possible utility tasks comprises:

calculating an estimated execution time for each of the possible utility tasks;

analyzing a set of operations for the utility command;

determining one or more necessary functions of the utility command based on the analyzing;

identifying data inputs for the set of operations of the utility command based on the analyzing; and selecting utility tasks for each of the one or more necessary functions of the set of operations based on the data inputs and the estimated execution time.

19. The computer program product of claim 17, wherein generating the utility execution plan for the utility command comprises:

determining a first predicted time to execute the preferred utility tasks in a non-parallel execution, resulting in a non-parallel execution time;

determining a second predicted time to execute the preferred utility tasks in a parallel execution, wherein eligible preferred utility tasks are executed in parallel based on at least the degree of parallelism, resulting in a parallel execution time;

comparing the non-parallel execution time to the parallel execution time;

determining system resources available for executing the utility command, resulting in available system resources; and selecting one or more preferred utility tasks to execute in parallel, based on the comparing and the available system resources.

20. The computer program product of claim 17, wherein analyzing the utility execution plan against the resource constraints of the time window and the sub time windows of the time window comprises:

arranging utility tasks in the utility execution plan based on the sub time windows, resulting in utility task sub-groups;

analyzing the resource constraints for each sub time window from the sub time windows; and estimating a sub-group execution time for each utility task sub-group from the utility task sub-groups based on the resource constraints for each sub time window.

* * * * *